US008514334B2

(12) United States Patent
Nakamura et al.

(10) Patent No.: US 8,514,334 B2
(45) Date of Patent: Aug. 20, 2013

(54) IMAGE DISPLAY DEVICE FOR DISPLAYING COLOR IMAGE ON COLOR DISPLAY UNIT

(75) Inventors: Yuya Nakamura, Daito (JP); Masahiro Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 17 days.

(21) Appl. No.: 13/371,554

(22) Filed: Feb. 13, 2012

(65) Prior Publication Data

US 2012/0206478 A1 Aug. 16, 2012

(30) Foreign Application Priority Data

Feb. 15, 2011 (JP) ................................ 2011-030138

(51) Int. Cl.
*H04N 9/73* (2006.01)

(52) U.S. Cl.
USPC ........... 348/655; 348/807; 348/656; 348/657; 348/658; 345/569

(58) Field of Classification Search
USPC .................. 345/589-600; 348/624, 655-658
See application file for complete search history.

(56) References Cited

U.S. PATENT DOCUMENTS

2001/0015774 A1 8/2001 Endo et al.
2006/0238480 A1 10/2006 Furihata et al.

FOREIGN PATENT DOCUMENTS

JP 2004-180090 A 6/2004
JP 3697997 B2 7/2005
JP 4536582 B2 6/2010

*Primary Examiner* — Jefferey Harold
*Assistant Examiner* — Samira Monshi
(74) *Attorney, Agent, or Firm* — Morgan, Lewis & Bockius LLP

(57) ABSTRACT

An image display device such as an LCD television comprises a microcomputer and LUTs (look-up tables) which are tables of correction data for correcting color balance of an image to be displayed. The microcomputer recalculates correction data in the LUTs and updates the correction data to the recalculated correction data based on: an input value InL of image data of a Low side white balance adjustment image; an input value InH of image data of a High side white balance adjustment image; and a gain value GainL and a gain value GainH which are provided to the input value InL and the input value InH, respectively, to bring color balance of the Low side white balance adjustment image and the High side white balance adjustment image to a predetermined color balance, respectively.

16 Claims, 4 Drawing Sheets

IMAGE DISPLAY DEVICE FOR DISPLAYING COLOR IMAGE ON COLOR DISPLAY UNIT

BACKGROUND OF THE INVENTION

1. Field of the Invention

The present invention relates to an image display device for displaying a color image on a color display unit.

2. Description of the Related Art

Image display devices for displaying color images on a color display unit in the prior art include a so-called liquid crystal display (hereafter referred to as LCD) television, which receives a television signal broadcast from a television broadcast station and displays a color image based on the television signal on an LCD panel as a color display unit.

BRIEF SUMMARY OF THE INVENTION

The LCD television comprises a look-up table (hereafter referred to as LUT) which stores correction data for correcting color balance (hue) of an image to be displayed on the LCD panel (so as to achieve predetermined color balance). It is designed that an image based on a television signal is corrected for color balance based on the correction data in the LUT (so as to achieve predetermined color balance), and then is displayed on the LCD panel. More specifically, such an LCD television is designed to use the correction data in the LUT to correct an input signal value representing a brightness level of each color of red, green and blue in image data of the image based on the television signal (i.e. image data generated from the television signal), so as to display a color image based on the corrected input signal value.

Note that correction data in an LUT is calculated and generated using one LCD television called average product and based on color balance of an image displayed on this LCD television. However, there are individual differences among individual LCD televisions. This causes differences in color balance (hue) among resultant images displayed on individual LCD televisions even if the color balance of an image based on the same image data is corrected in the same way based on the same correction data in the LUT in the individual LCD televisions. This means that a color balance of a displayed color image after corrected based on correction data in an LUT may, in some cases, not be a predetermined color balance due to individual differences among individual LCD televisions.

Thus, an adjustment called white balance adjustment is made in such LCD televisions before shipment in order to eliminate differences in color balance or hue of displayed images due to individual differences among individual LCD televisions, or more specifically to bring a color balance of a displayed color image to a predetermined color balance when the color balance of the displayed image after corrected based on correction data in an LUT is not the predetermined color balance due to the individual differences among the individual LCD televisions. A conventional LCD television is designed such that a gain and an offset are provided to an input signal value representing a brightness level of each color of red, green and blue in given image data (image data generated from a television signal), and each input signal value provided with the gain and the offset is corrected based on correction data in an LUT so as to display a color image on an LCD panel based on each corrected input signal value, and that the white balance adjustment is made (i.e. color balance of the displayed image is brought to a predetermined color balance) by adjusting the gain value and the offset value provided to the input signal value.

The conventional LCD television comprises a gain adjustment unit for providing gain to an input signal value and an offset adjustment unit for providing offset to the input signal value. The white balance is adjusted by adjusting a gain value of the gain adjustment unit (more specifically, a gain value provided to the input signal value) and adjusting an offset value of the offset adjustment unit (more specifically, an offset value provided to the input signal value) without replacing the LUT by another or updating the correction data of the LUT. The white balance adjustment in the conventional LCD television is made by displaying a predetermined white balance adjustment image (white color or neutral color image with a predetermined brightness level) on the LCD panel, and by adjusting the gain value of the gain adjustment unit and the offset value of the offset adjustment unit so as to bring the color balance of the displayed white balance adjustment image to a predetermined color balance.

More specifically, image data of a white balance adjustment image is provided to the LCD television from a white balance adjustment image supply device as an external device, so as to provide a gain and an offset (gain of 1 and offset of 0 in an initial state) to an adjustment input value (input value used for adjustment) which is an input signal value representing a brightness level of each color of red, green and blue in the image data of the white balance adjustment image provided to the LCD television. The adjustment input value provided with the gain and the offset is corrected based on the correction data in the LUT, and the white balance adjustment image based on the thus corrected adjustment input value is displayed on the LCD panel. The color balance of the white balance adjustment image displayed on the LCD panel is measured by a measuring device as an external device. The gain value of the gain adjustment unit and the offset value of the offset adjustment unit are adjusted so as to allow the measured color balance value to be in a predetermined range, i.e. bring the color balance of the white balance adjustment image displayed on the LCD panel to a predetermined color balance.

Even more specifically, as the white balance adjustment image, two white balance adjustment images with different brightness levels (the white balance adjustment image with a lower brightness level being hereafter referred to as Low side white balance adjustment image, and the white balance adjustment image with a higher brightness level being hereafter referred to as High side white balance adjustment image) are displayed on the LCD panel. The gain value of the gain adjustment unit is adjusted to bring the color balance of the High side white balance adjustment image to a predetermined color balance, while the offset value of the offset adjustment unit is also adjusted to bring the color balance of the Low side white balance adjustment image to a predetermined color balance. This is done by repeating a process of displaying the High side white balance adjustment image on the LCD panel and adjusting the gain value of the gain adjustment unit, and a process of displaying the Low side white balance adjustment image on the LCD panel and adjusting the offset value of the offset adjustment unit, whereby the gain value of the gain adjustment unit and the offset value of the offset adjustment unit are adjusted so as to bring the color balance of each of the High side white balance adjustment image and the Low side white balance adjustment image to a predetermined color balance. The white balance adjustment is made in this way.

In order to display a color image based on a television signal after the white balance adjustment is made, the thus adjusted gain value and offset value are used to provide a gain and an offset to the input signal value representing a brightness level of each color of red, green and blue in the image data of the color image to be displayed, and each input signal value provided with the gain and the offset is corrected based on the correction data in the LUT so as to display a color image on the LCD panel based on each corrected input signal value. Here, the gain value and the offset value after adjusted by the white balance adjustment are equally applied to the entire range of the input signal value, so that a gain and an offset based on the thus adjusted gain value and offset value are equally provided to the input signal value representing a brightness level of each color of red, green and blue in the image data of the image to be displayed.

However, the conventional white balance adjustment described above has the following problems. (1) First, as described above, an offset is equally provided to an input signal value representing a brightness level of each color of red, green and blue in image data of an image to be displayed. Thus, when the input signal value is low (particularly when it is lower than the Low side adjustment input value), the color accuracy of the displayed image is lowered (the color balance of the displayed image is caused to shift from the predetermined color balance). For example, when the offset value provided to the input signal value representing the brightness level of red is a positive value, the displayed image is caused to take on reddish color, more than expected, in dark areas (areas of the displayed image with low brightness) including black.

(2) Second, the gain adjustment by displaying the High side white balance adjustment image and the offset adjustment by displaying the Low side white balance adjustment image influence each other. This increases time for the adjustment because it is required to repeat many times the offset adjustment process to bring the color balance of the Low side white balance adjustment image to a predetermined color balance as well as the gain adjustment process to bring the color balance of the High side white balance adjustment image to a predetermined color balance until the color balance of both Low side and High side white balance adjustment images is brought to a standard value (predetermined color balance) (more specifically, until it becomes possible to determine the gain value and the offset value which bring the color balance of both Low side and High side white balance adjustment images to the predetermined color balance).

Thus, according to the conventional white balance adjustment technology, displayed images have low color accuracy after the white balance adjustment. In other words, the white balance adjustment has low accuracy. Further, it requires a long time for the white balance adjustment. Although the problems of white balance adjustment have been described above using an LCD panel as an example, similar problems can be found in other image display devices for displaying color images on a color display unit such as plasma display panels, CRT (Cathode Ray Tube) display panels and organic EL (Electroluminescence) display panels. The following describes some technologies to use an LUT for the purpose of e.g. image adjustment in various devices in the prior art.

Japanese Patent Publication 3697997 discloses an image display device. It measures contrast, and sets a dynamic range of contrast which can be used for display, and further makes gain adjustment and offset adjustment adapted to the dynamic range. Thereafter, it recalculates and writes data in an LUT to achieve full dynamic range. Further, Japanese Patent 4536582 discloses a display control device. It uses a tone value of output image data as an argument, and also uses, as an array element, a logical number indicating use or non-use, in an LUT, of a tone value corresponding to an argument so as to generate an LUT based on a sum of an argument and an array element.

Furthermore, Japanese Laid-open Patent Publication 2004-180090 discloses a video signal processing device. It subjects three primary color input signals to level adjustment with the same gain as each other based on first gain data so as to generate three primary color internal video signals. It then uses an LUT having non-linear characteristics written therein using, as an address, a maximum value selected from the three primary color internal video signals for each pixel so as to generate second gain data corresponding to the maximum value selected from the three primary color internal video signals for each pixel. It updates the LUT based on input non-linear characteristics data. However, such technologies disclosed in the prior art do not solve the above problems.

An object of the present invention is to provide an image display device which can increase accuracy of white balance adjustment and reduce time required for white balance adjustment.

According to a first aspect of the present invention, this object is achieved by an image display device comprising: a color display unit for displaying a color image; a look-up table which stores correction data for correcting color balance of the color image to be displayed on the color display unit; look-up table recalculating means for recalculating the correction data in the look-up table; and look-up table updating means for updating the correction data in the look-up table to the correction data recalculated by the look-up table recalculating means.

The correction data in the look-up table represents a relationship between a pre-correction value representing a pre-correction brightness level of each of colors including red, green and blue and a post-correction value representing a brightness level to be output after correcting the pre-correction value.

An input signal value representing a brightness level of each of colors including red, green and blue in an input image data is corrected based on the correction data in the look-up table so that the color display unit displays a color image based on the corrected input signal value on the color display unit.

Assuming that x denotes the pre-correction value, y=F(x) denotes the post-correction value before recalculation by the look-up table recalculating means, and y=G(x) denotes the post-correction value after recalculation by the look-up table recalculating means, the look-up table recalculating means recalculates the post-correction value in the look-up table as:

$$y=G(x)=F((\alpha\times \mathrm{Gain}H+(1-\alpha)\times \mathrm{Gain}L)\times x) \text{ in the range of } \mathrm{In}L<x<\mathrm{In}H,$$

where $\alpha=(x-\mathrm{InL})/(\mathrm{InH}-\mathrm{InL})$, and InL, InH, GainL and GainH denote:

InL: input signal value of image data of a lower brightness white balance adjustment image which is one of at least two white balance adjustment images with a lower brightness level, InH: input signal value of image data of a higher brightness white balance adjustment image which is another one of the at least two white balance adjustment images with a higher brightness level, GainL: gain value provided to the input signal value InL of the image data of the lower brightness white balance adjustment image so as to bring the color balance of the lower brightness white balance adjustment image to a predetermined color balance, and GainH: gain value provided to the input signal value InH of the image data of the higher brightness white balance adjustment image so as to bring the color balance of the higher brightness white balance adjustment image to a predetermined color balance.

According to the first aspect of the present invention, it is possible in each image display device to appropriately update correction data in the look-up table (which may hereafter be referred to as LUT) for correcting each input signal value representing a brightness level of each of colors including red, green and blue in image data of an image to be displayed. Thus, it is possible to correct each input signal value based on the correction data, which has been updated to be appropriate for each image display device, in the LUT over the entire range of the each input signal value representing the brightness level of each of colors including red, green and blue in the image data of the image to be displayed. This makes it possible to increase color accuracy of the displayed image (i.e. to bring the color balance of the displayed image to a predetermined color balance) after the white balance adjustment is made, thereby increasing accuracy of the white balance adjustment.

Furthermore, according to the first aspect of the present invention, the white balance adjustment is made by recalculating and updating correction data in the LUT, in which the recalculation and updating of the correction data in the LUT can be performed in a short time, thereby making it possible to reduce time required for white balance adjustment. In addition, it is only required to change software in a conventional image display device without need to change the hardware structure of the image display device. Thus, it is possible to achieve the increase in the accuracy of white balance adjustment and reduce the time required for the white balance adjustment without increasing the cost of the image display device. In addition, the first aspect of the present invention makes it possible to achieve good color temperature linearity as output characteristics (color output characteristics of displayed images) of a color display unit after white balance adjustment in the range of InL<x<InH. Thus, it is possible to further increase color accuracy of the displayed image after the white balance adjustment is made, thereby further increasing accuracy of the white balance adjustment.

According to a second aspect of the present invention, the above object is achieved by an image display device comprising: a color display unit for displaying a color image; a look-up table which stores correction data for correcting color balance of the color image to be displayed on the color display unit; look-up table recalculating means for recalculating the correction data in the look-up table; and look-up table updating means for updating the correction data in the look-up table to the correction data recalculated by the look-up table recalculating means.

The correction data in the look-up table represents a relationship between a pre-correction value representing a pre-correction brightness level of each of colors including red, green and blue and a post-correction value representing a brightness level to be output after correcting the pre-correction value.

An input signal value representing a brightness level of each of colors including red, green and blue in an input image data is corrected based on the correction data in the look-up table so that the color display unit displays a color image based on the corrected input signal value on the color display unit.

Assuming that x denotes the pre-correction value, y=F(x) denotes the post-correction value before recalculation by the look-up table recalculating means, and y=G(x) denotes the post-correction value after recalculation by the look-up table recalculating means, the look-up table recalculating means recalculates the post-correction value in the look-up table as:

$$y=G(x)=F((\beta\times 1+(1-\beta)\times \mathrm{Gain}H)\times x) \text{ in the range of } \mathrm{In}H\leqq x\leqq \mathrm{InMAX} \text{ in the case of } \mathrm{Gain}H>1,$$

where β=(x−InH)/(InMAX−InH), and InH, InMAX and GainH denote:

InH: input signal value of image data of a higher brightness white balance adjustment image which is one of at least two white balance adjustment images with a higher brightness level, InMAX: maximum possible value of the pre-correction value x, and GainH: gain value provided to the input signal value InH of the image data of the higher brightness white balance adjustment image so as to bring the color balance of the higher brightness white balance adjustment image to a predetermined color balance.

According to the second aspect of the present invention, effects similar to those obtained by the first aspect of the present invention as described above can be obtained. In addition, the second aspect of the present invention makes it possible to achieve good color temperature linearity as output characteristics (color output characteristics of displayed images) of a color display unit after white balance adjustment in the range of InH≦x≦InMAX. Thus, it is possible to further increase color accuracy of the displayed image after the white balance adjustment is made, thereby further increasing accuracy of the white balance adjustment.

According to a third aspect of the present invention, this object is achieved by an image display device comprising: a color display unit for displaying a color image; a look-up table which stores correction data for correcting color balance of the color image to be displayed on the color display unit; look-up table recalculating means for recalculating the correction data in the look-up table; and look-up table updating means for updating the correction data in the look-up table to the correction data recalculated by the look-up table recalculating means.

The correction data in the look-up table represents a relationship between a pre-correction value representing a pre-correction brightness level of each of colors including red, green and blue and a post-correction value representing a brightness level to be output after correcting the pre-correction value.

An input signal value representing a brightness level of each of colors including red, green and blue in an input image data is corrected based on the correction data in the look-up table so that the color display unit displays a color image based on the corrected input signal value on the color display unit.

Assuming that x denotes the pre-correction value, y=F(x) denotes the post-correction value before recalculation by the look-up table recalculating means, and y=G(x) denotes the post-correction value after recalculation by the look-up table recalculating means, the look-up table recalculating means recalculates the post-correction value in the look-up table as:

$$y=G(x)=F((\alpha\times \mathrm{Gain}H(1-\alpha)\times \mathrm{Gain}L)\times x) \text{ in the range of } \mathrm{In}L<x<\mathrm{In}H,$$

and $$y=G(x)=F((\beta\times 1+(1-\beta)\times \mathrm{Gain}H)\times x) \text{ in the range of } \mathrm{In}H\leqq x\leqq \mathrm{InMAX} \text{ in the case of } \mathrm{Gain}H>1,$$

where α=(x−InL)/(InH−InL) and β=(x−InH)/(InMAX−InH), and InL, InH, InMAX, GainL and GainH denote:

InL: input signal value of image data of a lower brightness white balance adjustment image which is one of at least two white balance adjustment images with a lower brightness level, InH: input signal value of image data of a higher brightness white balance adjustment image which is another one of the at least two white balance adjustment images with a higher brightness level, InMAX: maximum possible value of the pre-correction value x, GainL: gain value provided to the input signal value InL of the image data of the lower brightness white balance adjustment image so as to bring the color balance of the lower brightness white balance adjustment image to a predetermined color balance, and GainH: gain value provided to the input signal value InH of the image data of the higher brightness white balance adjustment image so as to bring the color balance of the higher brightness white balance adjustment image to a predetermined color balance.

According to the third aspect of the present invention, effects similar to those obtained by the first aspect of the present invention as described above can be obtained. In addition, the third aspect of the present invention makes it possible to achieve good color temperature linearity as output characteristics (color output characteristics of displayed images) of a color display unit after white balance adjustment in the range of $InL<x\leqq InMAX$ (sum of the ranges of $InL<x<InH$ and $InH\leqq x\leqq InMAX$). Thus, it is possible to further increase color accuracy of the displayed image after the white balance adjustment is made, thereby further increasing accuracy of the white balance adjustment.

According to a preferred mode of the third aspect of the present invention, the look-up table recalculating means recalculates the post-correction value in the look-up table as:

$$y=G(x)=F(\mathrm{Gain}L\times x) \text{ in the range of } \mathrm{InMIN}\leqq x\leqq \mathrm{In}L; \text{ and}$$

$$y=G(x)=F(\mathrm{Gain}H\times x) \text{ in the range of } \mathrm{In}H\leqq x\leqq \mathrm{InMAX} \text{ in the case of } \mathrm{Gain}H\leqq 1,$$

where InMIN denotes a minimum possible value of the pre-correction value x. This preferred mode makes it possible to further increase color accuracy of the displayed image after the white balance adjustment is made, thereby further increasing accuracy of the white balance adjustment.

According to the first, second and third aspect of the present invention, it is an alternative that the look-up table recalculating means recalculates the correction data in the look-up table by using, in place of GainL, an offset value provided to the input value InL of the image data of the lower brightness white balance adjustment image so as to bring the color balance of the lower brightness white balance adjustment image to the predetermined color balance, and by using, in place of GainH, an offset value provided to the input value InH of the image data of the higher brightness white balance adjustment image so as to bring the color balance of the higher brightness white balance adjustment image to the predetermined color balance. According to this alternative, effects similar to those obtained by the first, second and third aspect of the present invention as described above can be obtained.

According to a further preferred mode of the present invention, the image display device further comprises error notification means for checking the recalculated correction data to notify an error if the error notification means determines that there is an area in the recalculated correction data where the post-correction value y=G(x) decreases as the pre-correction value x increases. According to the further preferred mode of the present invention, an operator can be aware of the occurrence of a declination error of the post-correction value y=G(x). This makes it possible for the operator to allow the image display device to use another method (another equation) to recalculate the correction data in the LUTs for the color display unit in which the declination error of the post-correction value y=G(x) has occurred, so that the declination error of the post-correction value y=G(x) can be prevented, or so that the color display unit, in which the declination error of the post-correction values y=G(x) has occurred, can be separated out as a defective product.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DETAILED DESCRIPTION OF THE INVENTION

Figure 1:
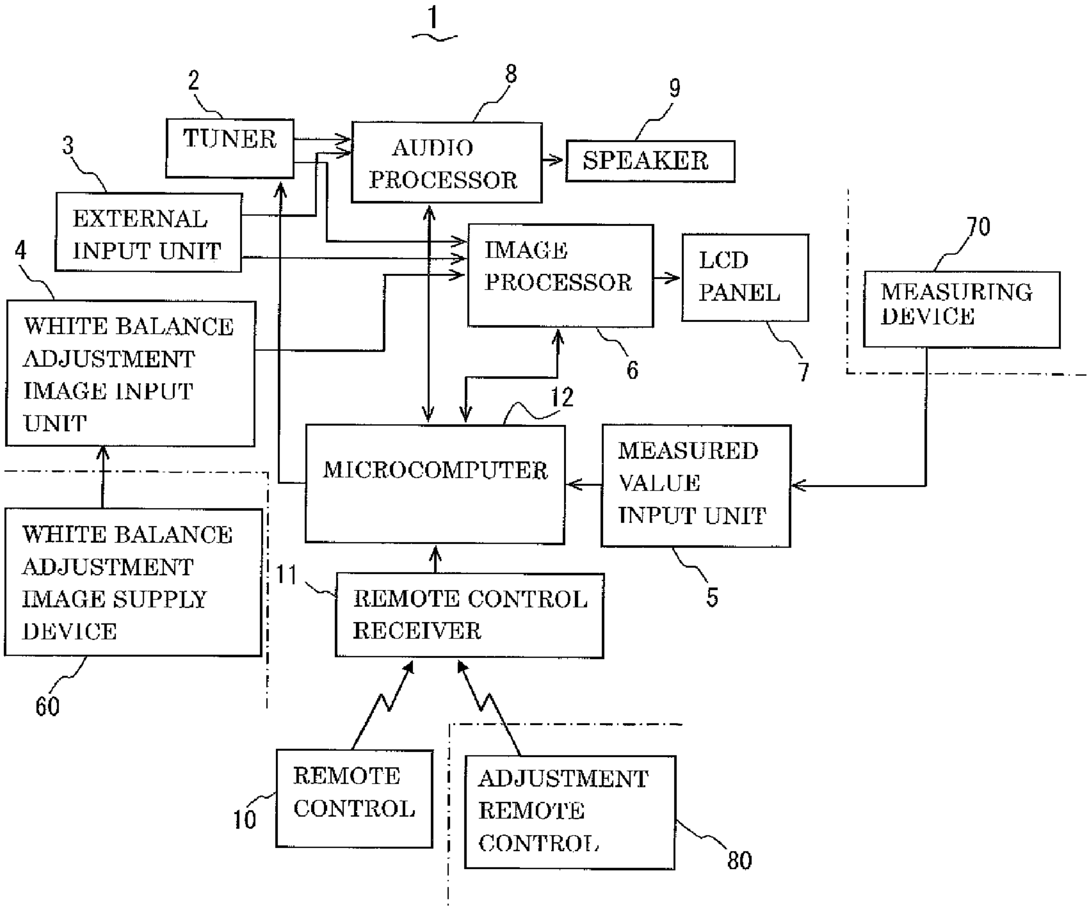
FIG. 1 is a schematic block diagram of an LCD television according to an embodiment of the present invention.

Embodiments of the present invention, as best mode for carrying out the invention, will be described hereinafter with reference to the drawings. The present invention relates to an image display device for displaying a color image on a color display unit. It is to be understood that the embodiments described herein are not intended as limiting, or encompassing the entire scope of, the present invention. Note that like parts are designated by like reference numerals, characters or symbols throughout the drawings.

FIG. 1 is a schematic block diagram of an LCD (liquid crystal display) television 1 which is an example of an image display device according to an embodiment of the present invention. The LCD television 1 is a device for receiving a television signal broadcast from a television broadcast station so as to display an image (color image) and output sound based on the television signal. The LCD television 1 can be connected to an external device, such as a personal computer and a BD (Blue-Ray Disc) player, so as to display an image and output sound based on image data and audio data, respectively, which are output from the external device. The LCD television 1 comprises a look-up table (hereafter referred to as LUT) which stores correction data for correcting color balance (hue) of a color image to be displayed on an LCD panel 7 (for correction to achieve predetermined color balance). The LCD television 1 is designed such that the color balance of the image based on a television signal is corrected based on the correction data in the LUT, and then is displayed on the LCD panel 7.

The LCD television 1 has a function to make white balance adjustment, which is to eliminate differences in color balance or hue of the displayed image due to individual differences among individual LCD televisions (among individual LCD panels), or more specifically to bring color balance of the displayed image to a predetermined color balance when the color balance of the displayed image after corrected based on correction data in an LUT is not a predetermined color balance due to the individual differences among the individual LCD televisions. According to the present embodiment, the white balance adjustment is made by adjusting (more specifically by recalculating and updating) correction data in the LUT.

The LCD television 1 makes white balance adjustment by using a white balance adjustment image supply device 60 as an external device, a measuring device 70 and an adjustment remote control 80. The white balance adjustment image supply device 60 outputs white balance adjustment image data as image data of a white balance adjustment image to be used to make white balance adjustment (more specifically to recalculate correction data in an LUT). The measuring device 70 measures color balance of an image to be measured, and outputs a measured color balance value. The adjustment remote control 80 is operated by a person to make the adjustment, who commands various operations for making the white balance adjustment, so as to transmit operation signals indicating content of the operations by using a wireless signal.

The LCD television 1 comprises a tuner 2, an external input unit 3, a white balance adjustment image input unit 4, a measured value input unit 5, an image processor 6, an LCD panel 7 as a color display unit, an audio processor 8, a speaker 9, a remote control 10, a remote control receiver 11, a microcomputer 12 for controlling the operation of the LCD television 1, and so on. Under the control of the microcomputer 12, the tuner 2 receives a television signal broadcast from a television broadcast station, and generates image data of a color image based on the television signal and audio data of sound also based on the television signal. The external input unit 3 is connected to an external device such as a personal computer and a BD player, and receives input of image data and audio data output from the external device. The white balance adjustment image input unit 4 is used when to make the white balance adjustment, and is connected to the white balance adjustment image supply device 60 so as to receive input of white balance adjustment image data output from the white balance adjustment image supply device 60. The measured value input unit 5 is also used when to make the white balance adjustment, and is connected to the measuring device 70 so as to receive input of the measured color balance value output from the measuring device 70.

Under the control of the microcomputer 12, the image processor 6 performs various image (data) processing on the image data generated by the tuner 2, the image data input from the external input unit 3, the white balance adjustment image data input from the white balance adjustment image input unit 4, and OSD (On Screen Display) image data (i.e. image data to display various images on a screen) provided by the microcomputer 12. The image processor 6 then supplies the processed image data to the LCD panel 7. The LCD panel 7 displays a color image based on the image data supplied from the image processor 6.

Further, under the control of the microcomputer 12, the audio processor 8 subjects the audio data generated by the tuner 2 and the audio data input from the external input unit 3 to various audio data processing, and supplies the processed audio data to the speaker 9. The speaker 9 outputs sound based on the audio data supplied from the audio processor 8. The remote control 10 is operated by a user to command various operations of the LCD television 1 so as to transmit operation signals indicating the content of the operations by using infrared. The remote control receiver 11 receives the operation signals transmitted from the remote control 10, and also receives the operation signals transmitted from the adjustment remote control 80. The microcomputer 12 controls various operations of the LCD television 1 including those described above.

Figure 2:
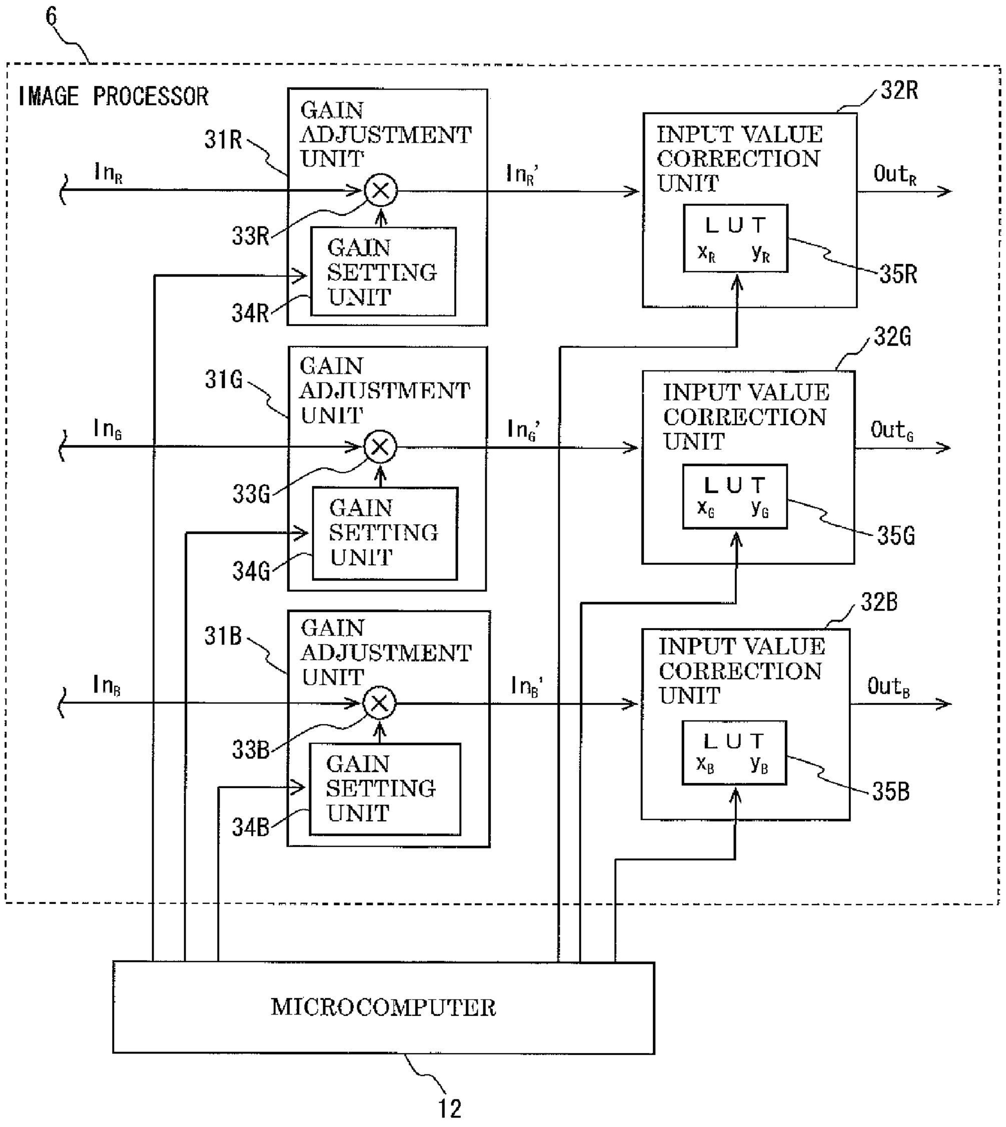
FIG. 2 is a schematic block diagram of an example of an image processor with a microcomputer in the LCD television.

FIG. 2 is a schematic block diagram of an example of the image processor 6 with the microcomputer 12 in the LCD television 1. The image processor 6 comprises gain adjustment units 31R, 31G, 31B and input value correction units 32R, 32G, 32B as well as various data processing units (not shown). Input to the image processor 6 are image data generated by the tuner 2, image data input from the external input unit 3, white balance adjustment image data input from the white balance adjustment image input unit 4, and OSD image data provided by the microcomputer 12. Under the control of the microcomputer 12, the image data input to the image processor 6 is subjected to various image data processing by the various data processing units (not shown). Input signal values $In_R$, $In_G$, $In_B$ representing brightness levels of respective colors of red, green and blue in the input and processed image data are input to the gain adjustment units 31R, 31G, 31B. The gain adjustment units 31R, 31G, 31B serve to provide gain to the input signal values $In_R$, $In_G$, $In_B$ representing brightness levels of respective colors of red, green and blue in the image data. The gain adjustment unit 31R comprises a multiplier circuit 33R and a gain setting unit 34R, and the gain adjustment unit 31G comprises a multiplier circuit 33G and a gain setting unit 34G, while the gain adjustment unit 31B comprises a multiplier circuit 33B and a gain setting unit 34B.

The multiplier circuit 33R of the gain adjustment unit 31R multiplies the input signal value $In_R$ representing the brightness level of red by a gain value set in the gain setting unit 34R so as to provide a gain to the input signal value $In_R$ (input signal value $In_R$ provided with a gain being hereafter referred to as gain-modified input signal value $In_R'$). The multiplier circuit 33G of the gain adjustment unit 31G multiplies the input signal value $In_G$ representing the brightness level of green by a gain value set in the gain setting unit 34G so as to provide a gain to the input signal value $In_G$ (input signal value $In_G$ provided with a gain being hereafter referred to as gain-modified input signal value $In_G'$). Similarly, the multiplier circuit 33B of the gain adjustment unit 31B multiplies the input signal value $In_B$ representing the brightness level of blue by a gain value set in the gain setting unit 34B so as to provide a gain to the input signal value $In_B$ (input signal value $In_B$ provided with a gain being hereafter referred to as gain-modified input signal value $In_B'$).

The gain-modified input signal values $In_R'$, $In_G'$, $In_B'$ (i.e. the input signal values $In_R$, $In_G$, $In_B$ provided with the gain by the gain adjustment units 31R, 31G, 31B that are output signal values of the gain adjustment units 31R, 31G, 31B) are respectively input to the input value correction units 32R, 32G, 32B. Assuming that $Gain_R$, $Gain_G$, $Gain_B$ denote gain values provided by (or set in) the gain setting units 34R, 34G, 34B, respectively, the gain-modified input signals values $In_R'$, $In_G'$, $In_B'$ are expressed as $In_R'=In_R \times Gain_R$, $In_G'=In_G \times Gain_G$ and $In_B'=In_B \times Gain_B$, respectively. The input value correction units 32R, 32G, 32B serve to correct color balance of a color image to be displayed on the LCD panel 7. The input value correction units 32R, 32G, 32B respectively comprise an LUT 35R, an LUT 35G and an LUT 35B.

Each of the LUTs 35R, 35G, 35B is a table of correction data for correcting color balance of the color image to be displayed on the LCD panel 7. The correction data in the LUTs 35R, 35G, 35B represents relationships between pre-correction values representing pre-correction brightness levels of the respective colors of red, green and blue and post-correction values representing brightness levels to be output after correcting the pre-correction values, respectively. More specifically, the correction data in the LUT 35R represents a relationship between a pre-correction value $x_R$ representing a pre-correction brightness level of the red color and a post-correction value $y_R$ representing a brightness level of the red color to be output after correcting the pre-correction value $x_R$. The correction data in the LUT 35G represents a relationship between a pre-correction value $x_G$ representing a pre-correction brightness level of the green color and a post-correction value $y_G$ representing a brightness level of the green color to be output after correcting the pre-correction value $x_G$. Similarly, the correction data in the LUT 35B represents a relationship between a pre-correction value $x_B$ representing a pre-correction brightness level of the blue color and a post-correction value $y_B$ representing a brightness level of the blue color to be output after correcting the pre-correction value $x_B$.

The input value correction units 32R 32G, 32B correct the gain-modified input signal values $In_R'$, $In_G'$, $In_B'$ based on the correction data in the LUTs 35R, 35G, 35B, respectively. More specifically, the input value correction unit 32R uses the LUT 35R as a reference to output, as an output signal value $OUT_R$, a post-correction value $y_R$ which corresponds to a pre-correction value $x_R$ equal to the gain-modified input signal value $In_R'$. The input value correction unit 32G uses the LUT 35G as a reference to output, as an output signal value $OUT_G$, a post-correction value $y_G$ which corresponds to a pre-correction value $x_G$ equal to the gain-modified input signal value $In_G'$. Similarly, the input value correction unit 32B uses the LUT 35B as a reference to output, as an output signal value $OUT_B$, a post-correction value $y_B$ which corresponds to a pre-correction value $x_B$ equal to the gain-modified input signal value $In_B'$. The output values $OUT_R$, $OUT_G$, $OUT_B$ output from the input value correction units 32R 32G, 32B (i.e. input signal values after corrected by the input value correction units 32R 32G, 32B) are supplied to the LCD panel 7 so that an image based on the output signal values $OUT_R$, $OUT_G$, $OUT_B$ is displayed on the LCD panel 7.

According to the LCD television 1 of the present embodiment using the thus formed image processor 6, when an image is displayed on the LCD panel 7, the gain adjustment units 31R, 31B, 31G provide gain to the input signal values $In_R$, $In_G$, $In_B$ representing brightness levels of respective colors of red, green and blue in the image data of such image. The gain-modified input signal values $In_R'$, $In_G'$, $In_B'$ ($In_R'=In_R\times Gain_R$, $In_G'=In_G\times Gain_G$, $In_B'=In_B\times Gain_B$) are corrected based on the correction data in the LUTs 35R, 35G, 35B, and an image based on the thus corrected input signal values (i.e. the output signal values $OUT_R$, $OUT_G$, $OUT_B$) is displayed on the LCD panel 7.

The gain values $Gain_R$, $Gain_G$, $Gain_B$ of the gain setting units 34R, 34G, 34B are set under the control of the microcomputer 12. More specifically, the microcomputer 12 controls adjustment of the gain value $Gain_R$ provided by the gain adjustment unit 31R to the input signal value $In_R$, and adjustment of the gain value $Gain_G$ provided by the gain adjustment unit 31G to the input signal value $In_G$ as well as adjustment of the gain value $Gain_B$ provided by the gain adjustment unit 31B to the input signal value $In_B$. Other than when displaying a white balance adjustment image, the microcomputer 12 sets each of the gain values $Gain_R$, $Gain_G$, $Gain_B$ of the gain setting units 34R, 34G, 34B to 1 (one). In other words, when displaying images (more specifically, an image based on image data generated by the tuner 2, an image based on image data input from the external input unit 3, and an image based on OSD image data provided by the microcomputer 12) other than a white balance adjustment image, the input signal values $In_R$, $In_G$, $In_B$ before provided with the gain are equal to the gain-modified input signal values $In_R'$, $In_G'$, $In_B'$ (input signal values $In_R$, $In_G$, $In_B$ provided with the gain), respectively.

Next, the white balance adjustment will be described. According to the present embodiment, the white balance adjustment is made by adjusting (more specifically by recalculating and updating) correction data in the LUTs 35R, 35G, 35B. The adjustment of the correction data in the LUTs 35R, 35G, 35B is made by recalculating and updating the correction data in the LUTs 35R, 35G, 35B based on input signal values of the image data of the white balance adjustment image, and also based on gain values which are provided to the input signals values of the image data of the white balance adjustment image so as to bring the color balance of the white balance adjustment image to a predetermined color balance.

More specifically, the adjustment of the correction data in the LUTs 35R, 35G, 35B is made by: (1) displaying a predetermined white balance adjustment image (white color or neutral color image with a predetermined brightness level) on the LCD panel 7; (2) adjusting the gain value of each of the gain adjustment units 31R, 31G, 31B to bring the color balance of the white balance adjustment image displayed on the LCD panel 7 to a predetermined color balance; (3) recalculating the correction data in the LUTs 35R, 35G, 35B based on the input signal values of the image data of the white balance adjustment image, and also based on the gain values of the gain adjustment units 31R, 31G, 31B to bring the color balance of the white balance adjustment image to the predetermined color balance; and (4) updating the correction data in the LUTs 35R, 35G, 35B to the recalculated correction data.

According to the present embodiment, two white balance adjustment images with different brightness levels are used as the white balance adjustment image so as to recalculate correction data in the LUTs 35R, 35G, 35B. In the following, one of the two white balance adjustment images with a lower brightness level and the other of the two white balance adjustment images with a higher brightness level will be respectively referred to as Low side (or lower brightness) white balance adjustment image and High side (or higher brightness) white balance adjustment image. Further, the input signal values $In_R$, $In_G$, $In_B$ representing brightness levels of respective colors of red, green and blue in the image data of the Low side white balance adjustment image will be respectively referred to as Low side adjustment input values $InL_R$, $InL_G$, $InL_B$ (Low side adjustment input value $InL_R$ for red color, Low side adjustment input value $InL_G$ for green color, and Low side adjustment input value $InL_B$ for blue color).

Further, the gain values $Gain_R$, $Gain_G$, $Gain_B$, which are provided to the Low side adjustment input values $InL_R$, $InL_G$, $InL_B$ so as to bring the color balance of the Low side white balance adjustment image displayed on the LCD panel 7 to the predetermined color balance, will be respectively referred to as Low side adjustment gain values $GainL_R$, $GainL_G$, $GainL_B$ (Low side adjustment gain value $GainL_R$ for red color, Low side adjustment gain value $GainL_G$ for green color, and Low side adjustment gain value $GainL_B$ for blue color). Similarly, the input signal values $In_R$, $In_G$, $In_B$ representing brightness levels of respective colors of red, green and blue in the image data of the High side white balance adjustment image will be respectively referred to as High side adjustment input values $InH_R$, $InH_G$, $InH_B$ (High side adjustment input value $InH_R$ for red color, High side adjustment input value $InH_G$ for green color, and High side adjustment input value $InH_B$ for blue color). Further, the gain values $Gain_R$, $Gain_G$, $Gain_B$, which are provided to the High side adjustment input values $InH_R$, $InH_G$, $InH_B$ so as to bring the color balance of the High side white balance adjustment image displayed on the LCD panel 7 to the predetermined color balance, will be respectively referred to as High side adjustment gain values $GainH_R$, $GainH_G$, $GainH_B$ (High side adjustment gain value $GainH_R$ for red color, High side adjustment gain value $GainH_G$ for green color, and High side adjustment gain value $GainH_B$ for blue color). Here, the term "adjustment input value" is used to mean input value used for adjustment, while the term "adjustment gain value" is used to mean gain value used for adjustment.

According to the present embodiment, the correction data in LUTs 35R, 35G, 35B are recalculated based on the Low side adjustment input values $InL_R$, $InL_G$, $InL_B$, the Low side adjustment gain values $GainL_R$, $GainL_G$, $GainL_B$, the High side adjustment input values $InH_R$, $InH_G$, $InH_B$, and the High side adjustment gain values $GainH_R$, $GainH_G$, $GainH_B$. The recalculation of the correction data in the LUTs 35R, 35G, 35B is performed by the microcomputer 12 using the following equations. Assuming that $x_R$, $x_G$, $x_B$ respectively denote pre-correction values representing pre-correction brightness levels of red, green and blue color in the LUTs 35R, 35G, 35B, and that $y_R=F_R(x_R)$, $y_G=F_G(x_G)$, $y_B=F_B(x_B)$ respectively denote post-correction values (representing post-correction brightness levels of red, green and blue output after correcting $x_R$, $x_G$, $x_B$) in the LUTs 35R, 35G, 35B before recalculation, and further that $y_R=G_R(x_R)$, $y_G=G_G(x_G)$, $y_B=G_B(x_B)$ respectively denote post-correction values (representing post-correction brightness levels of red, green and blue output after correcting $x_R$, $x_G$, $x_B$) in the LUTs 35R, 35G, 35B after recalculation, then the microcomputer 12 recalculates the post-correction value $y_R=G_R(x_R)$ in the LUT 35R as:

$y_R=G_R(x_R)=F_R(GainL_R \times x_R)$ in the range of $InMIN_R \leqq x_R \leqq InL_R$;

$y_R=G_R(x_R)=F_R((\alpha_R \times GainH_R+(1-\alpha_R) \times GainL_R) \times x_R)$ in the range of $InL_R<x_R<InH_R$;

$y_R=G_R(x_R)=F_R(GainH_R \times x_R)$ in the range of $InH_R \leqq x_R \leqq InMAX_R$ in the case of $GainH_R \leqq 1$; and $y_R=G_R(x_R)=F_R((\beta_R \times 1+(1-\beta_R) \times GainH_R) \times x_R)$ in the range of $InH_R \leqq x_R \leqq InMAX_R$ in the case of $GainH_R>1$, where $\alpha_R$ and $\beta_R$ are:

$\alpha_R=(x_R-InL_R)/(InH_R-InL_R)$; and $\beta_R=(x_R-InH_R)/(InMAX_R-InH_R)$, and where $InL_R$, $InH_R$, $InMIN_R$, $InMAX_R$, $GainL_R$ and $GainH_R$ denote:

$InL_R$: input signal value (Low side adjustment input value for red color) representing brightness level of red color in image data of Low side or lower brightness white balance adjustment image (one of the two white balance adjustment images with a lower brightness level), $InH_R$: input signal value (High side adjustment input value for red color) representing brightness level of red color in image data of High side or higher brightness white balance adjustment image (the other of the two white balance adjustment images with a higher brightness level), $InMIN_R$: minimum possible value of the pre-correction value $x_R$, $InMAX_R$: maximum possible value of the pre-correction value $x_R$, $GainL_R$: gain value (Low side adjustment gain value for red color) provided to the input signal value $InL_R$ representing the brightness level of red color in the image data of the Low side white balance adjustment image so as to bring the color balance of the Low side white balance adjustment image to a predetermined color balance, and $GainH_R$: gain value (High side adjustment gain value for red color) provided to the input signal value $InH_R$ representing the brightness level of red color in the image data of the High side white balance adjustment image so as to bring the color balance of the High side white balance adjustment image to a predetermined color balance.

In a manner similar to the above-described recalculation of the post-correction value $y_R=G_R(x_R)$ in the LUT 35R for red color, the microcomputer 12 recalculates the post-correction value $y_G=G_G(x_G)$ in the LUT 35G for green color and the post-correction value $y_B=G_B(x_B)$ in the LUT 35B for blue color, respectively. The microcomputer 12 forms LUT recalculating means and LUT updating means according to the present invention, i.e. LUT recalculating means for recalculating the correction data in each LUT, and LUT updating means for updating the correction data in each LUT to the correction data recalculated by the LUT recalculating means.

Adjustment of the correction data in the LUTs 35R, 35G, 35B is made as follows. First, a person (hereafter referred to as operator) to make the adjustment connects the white balance adjustment image supply device 60 to the white balance adjustment image input unit 4, and also connects the measuring device 70 to the measured value input unit 5. Then, the operator operates to output image data of a Low side white balance adjustment image from the white balance adjustment image supply device 60. Thereby, the image data of the Low side white balance adjustment image is input from the white balance adjustment image input unit 4, and gain is provided by the gain adjustment units 31R, 31G, 31B to the Low side adjustment input values $InL_R$, $InL_G$, $InL_B$, which are input signal values $In_R$, $In_G$, $In_B$ representing brightness levels of respective colors of red, green and blue in the image data of the Low side white balance adjustment image (Low side adjustment input values $InL_R$, $InL_G$, $InL_B$ each provided with a gain being hereafter referred to as gain-modified Low side adjustment input values $InL_R'$ $InL_G'$, $InL_B'$, respectively). The gain-modified Low side adjustment input values $InL_R'$ $InL_G'$, $InL_B'$ are corrected based on the correction data in the LUTs 35R, 35G, 35B, and a Low side white balance adjustment image based on the thus corrected gain-modified Low side adjustment input values is displayed on the LCD panel 7. The Low side adjustment input values $InL_R$, $InL_G$, $InL_B$ are e.g. designed to be 30 percent of the maximum possible values of the pre-correction values $x_R$, $x_G$, $x_B$, respectively.

The operator then uses the measuring device 70 to measure color balance of the Low side white balance adjustment image displayed on the LCD panel 7. The measured color balance value of the Low side white balance adjustment image measured by the measuring device 70 is input to the measured value input unit 5. Further, the operator operates the adjustment remote control 80 to command to determine Low side adjustment gain values $GainL_R$, $GainL_G$, $GainL_B$. In response, based on the measured color balance value input from the measured value input unit 5, the microcomputer 12 adjusts the gain values $Gain_R$, $Gain_G$, $Gain_B$ of the gain adjustment units 31R, 31G, 31B (i.e. gain values to be provided to the Low side adjustment input values $InL_R$, $InL_G$, $InL_B$) so as to allow the measured color balance value to be in a predetermined range, i.e. bring the color balance of the Low side white balance adjustment image displayed on the LCD panel 7 to a predetermined color balance.

The color balance of the Low side white balance adjustment image displayed on the LCD panel 7 varies with the adjustment of the gain value $Gain_R$, $Gain_G$, $Gain_B$ of the gain adjustment units 31R, 31G, 31B, and in turn, the measured color balance value input to the measured value input unit 5 varies with the color balance of the Low side white balance adjustment image displayed on the LCD panel 7. The gain values $Gain_R$, $Gain_G$, $Gain_B$ to allow the measured color balance value to be in a predetermined range, i.e. the gain values $Gain_R$, $Gain_G$, $Gain_B$ to bring the color balance of the Low side white balance adjustment image displayed on the LCD panel 7 to a predetermined color balance, are determined by the microcomputer 12 as the Low side adjustment gain values $GainL_R$, $GainL_G$, $GainL_B$.

Subsequently, the operator operates to output image data of a High side white balance adjustment image from the white balance adjustment image supply device 60. Thereby, the image data of the High side white balance adjustment image is input from the white balance adjustment image input unit 4, and gain is provided by the gain adjustment units 31R, 31G, 31B to the High side adjustment input values $InH_R$, $InH_G$, $InH_B$, which are input signal values $In_R$, $In_G$, $In_B$ representing brightness levels of respective colors of red, green and blue in the image data of the High side white balance adjustment image (High side adjustment input values $InH_R$, $InH_G$, $InH_B$ each provided with a gain being hereafter referred to as gain-modified High side adjustment input values $InH_R'$, $InH_G'$, $InH_B'$, respectively). The gain-modified High side adjustment input values $InH_R'$, $InH_G'$, $InH_B'$ are corrected based on the correction data in the LUTs 35R, 35G, 35B, and a High side white balance adjustment image based on the thus corrected gain-modified High side adjustment input values is displayed on the LCD panel 7. The High side adjustment input values $InH_R$, $InH_G$, $InH_B$ are e.g. designed to be 70 percent of the maximum possible values of the pre-correction values $x_R$, $x_G$, $x_B$, respectively.

The operator then uses the measuring device 70 to measure color balance of the High side white balance adjustment image displayed on the LCD panel 7. The measured color balance value of the High side white balance adjustment image measured by the measuring device 70 is input to the measured value input unit 5. Further, the operator operates the adjustment remote control 80 to command to determine High side adjustment gain values $GainH_R$, $GainH_G$, $GainH_B$. Thus, similarly as in the case of Low side white balance adjustment, the gain values $Gain_R$, $Gain_G$, $Gain_B$ to allow the measured color balance value to be in a predetermined range, i.e. the gain values $Gain_R$, $Gain_G$, $Gain_B$ to bring the color balance of the High side white balance adjustment image displayed on the LCD panel 7 to a predetermined color balance, are determined by the microcomputer 12 as the High side adjustment gain values $GainH_R$, $GainH_G$, $GainH_B$.

Further, the operator operates the adjustment remote control 80 to command to adjust correction data in the LUTs 35R, 35G, 35B. In response, the microcomputer 12 recalculates the correction data in the LUTs 35R, 35G, 35B based on the Low side adjustment input values $InL_R$, $InL_G$, $InL_B$, the Low side adjustment gain values $GainL_R$, $GainL_G$, $GainL_B$, the High side adjustment input values $InH_R$, $InH_G$, $InH_B$, and the High side adjustment gain values $GainH_R$, $GainH_G$, $GainH_B$. The recalculation of the correction data in the LUTs 35R, 35G, 35B is performed by the microcomputer 12 using the equations described above. Thereafter, the microcomputer 12 checks the recalculated correction data, and notifies an error if the microcomputer 12 determines, as a result of the checking, that there is an area in the recalculated correction data where the post-correction values $y_R=G_R(x_R)$, $y_G=G_G(x_G)$, $y_B=G_B(x_B)$ decrease as the pre-correction values $x_R$, $x_G$, $x_B$ increase (i.e. where the post-correction values $y_R=G_R(x_R)$, $y_G=G_G(x_G)$, $y_B=G_B(x_B)$ decline).

Here, the microcomputer 12 displays an image indicating an error on the LCD panel 7 so as to notify the operator of the error. More specifically, the microcomputer 12 provides OSD image data for indicating an error to the image processor 6 so as to display an image indicating the error on a screen of the LCD panel 7 so that the displayed image notifies the operator of the error. Thus, the microcomputer 12 forms error notification means according to the present invention for checking the recalculated correction data to notify an error if the microcomputer 12 determines that there is an area in the recalculated correction data where the post-correction values $y_R=G_R(x_R)$, $y_G=G_G(x_G)$, $y_B=G_B(x_B)$ decrease as the pre-correction values $x_R$, $x_G$, $x_B$ increase.

If the microcomputer 12 determines, as a result of checking the recalculated correction data, that there is no area in the correction data where the post-correction values $y_R=G_R(x_R)$, $y_G=G_G(x_G)$, $y_B=G_B(x_B)$ decrease as the pre-correction values $x_R$, $x_G$, $x_B$ increase, then the microcomputer 12 updates the correction data in the LUTs 35R, 35G, 35B to the recalculated correction data. Thus, the microcomputer 12 in the LCD television 1 forms LUT updating means according to the present invention for updating the correction data. Thereafter, the microcomputer 12 sets the gain value of each of the gain setting units 34R, 34G, 34B to 1 (one). The adjustment of the correction data in the LUTs 35R, 35G, 35B (i.e. white balance adjustment) is made in this way.

Figure 3:
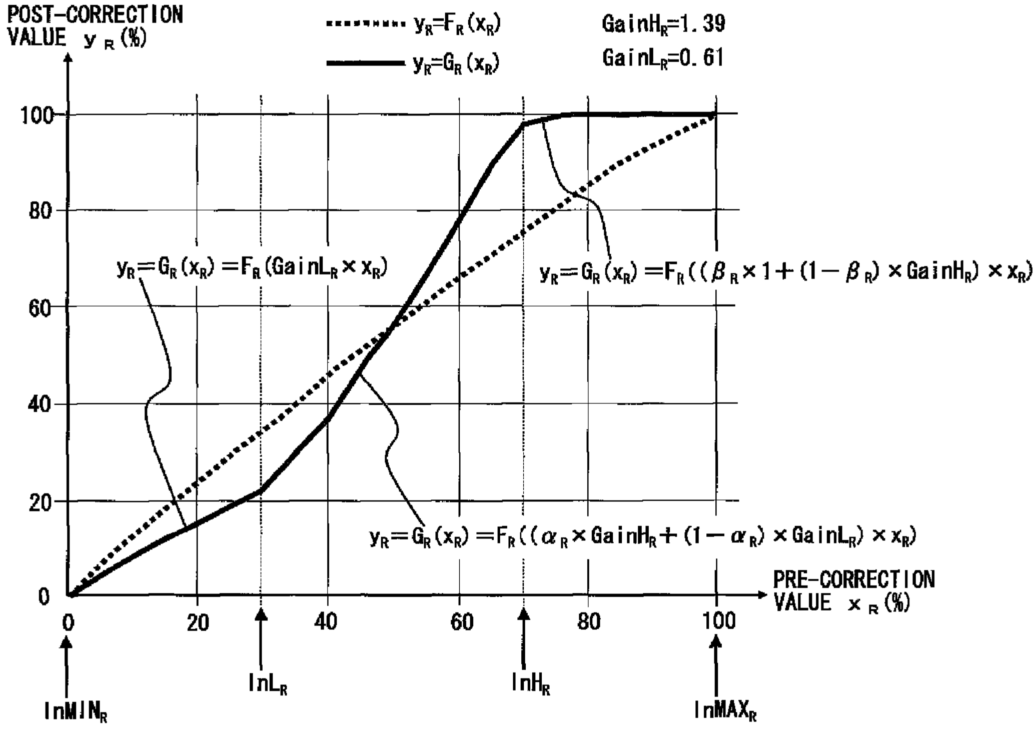
FIG. 3 is a graph showing an example of correction data in an LUT.

FIG. 3 is a graph showing an example of correction data in the LUT 35R, in which the horizontal axis represents pre-correction values $x_R$ representing pre-correction brightness levels of red color, and the vertical axis represents post-correction values $y_R$ representing brightness levels of the red color to be output after correcting the pre-correction values $x_R$. In FIG. 3, the curve $y_R=F_R(x_R)$ shows post-correction values before recalculation, while the curve $y_R=G_R(x_R)$ shows post-correction values after recalculation. The graph shows the correction data assuming that the minimum possible value $InMIN_R$ and maximum possible value $InMAX_R$ of the pre-correction values $x_R$ are 0 and 100, respectively, and that the minimum possible value and maximum possible value of the post-correction values $y_R$ are 0 and 100, respectively. In the graph, the curve $y_R=G_R(x_R)$ shown was obtained by recalculating the curve $y_R=F_R(x_R)$ shown, in which the white balance adjustment was made by setting the Low side adjustment input value $InL_R$ to 30 percent of the maximum possible value $InMAX_R$ of the pre-correction value $x_R$, and by setting the High side adjustment input value $InH_R$ to 70 percent of the maximum possible value $InMAX_R$ of the pre-correction value $x_R$, while the adjustment gain values were, respectively, Low side adjustment gain value $GainL_R=0.61$ and High side adjustment gain value $GainH_R=1.39$.

As described above, according to the embodiment of the present invention, it is possible to update correction data in the LUTs 35R, 35G, 35B for respective input signal values representing brightness levels of respective colors of red, green and blue in image data of an image to be displayed so as to correct the respective input signal values. Thus, it is possible to correct the input signal values based on the correction data in the LUTs 35R, 35G, 35B, respectively, over the entire range of the input signal values representing brightness levels of the respective colors of red, green and blue in the image data of the image to be displayed. This makes it possible to increase color accuracy of the displayed image (i.e. to bring the color balance of the displayed image to a predetermined color balance) after the white balance adjustment is made, thereby increasing accuracy of the white balance adjustment.

Furthermore, according to the present embodiment, the white balance adjustment is made by recalculating and updating correction data in the LUTs 35R, 35G, 35B, in which the recalculation and updating of the correction data in the LUTs 35R, 35G, 35B can be performed in a short time, thereby making it possible to reduce time required for white balance adjustment. In addition, it is only required to change software in a conventional image display device without need to change the hardware structure of the image display device. Thus, it is possible to achieve the increase in the accuracy of white balance adjustment and reduce the time required for the white balance adjustment without increasing the cost of the image display device.

Furthermore, the above-described recalculations according to the present embodiment can further increase the accuracy of white balance adjustment. More specifically, a post-correction value $y_i=G_i(x_i)$ is recalculated as $y_i=G_i(x_i)=F_i((\alpha_i\times GainH_i+(1-\alpha_i)\times GainL_i)\times x_i)$ in the range of $InL_i<x_i<InH_i$ where i=R,G,B. This makes it possible to achieve good color temperature linearity as output characteristics (color output characteristics of displayed images) of a color display unit after white balance adjustment in the range of $InL_i<x_i<InH_i$. Thus, it is possible to further increase color accuracy of the displayed image after the white balance adjustment is made, thereby further increasing accuracy of the white balance adjustment.

Further, the post-correction value $y_i=G_i(x_i)$ is recalculated as $y_i=G_i(x_i)=F_i((\beta_i\times 1+(1-\beta_i)\times GainH_i)\times x_i)$ in the range of $InH_i\leqq x_i\leqq InMAX_i$ in the case of $GainH_i>1$. This makes it possible to achieve good color temperature linearity as output characteristics (color output characteristics of displayed images) of a color display unit after white balance adjustment in the range of $InH_i\leqq x_i\leqq InMAX_i$ in the case of $GainH_i>1$. Thus, it is possible to further increase color accuracy of the displayed image after the white balance adjustment is made, thereby further increasing accuracy of the white balance adjustment. Further, the post-correction value $y_i=G_i(x_i)$ is recalculated as $y_i=G_i(x_i)=F_i(GainL_i\times x_i)$ in the range of $InMIN_i\leqq x_i\leqq InL_i$, whereby it is possible to further increase color accuracy of the displayed image after the white balance adjustment is made, thereby further increasing accuracy of the white balance adjustment. Still further, the post-correction value $y_i=G_i(x_i)$ is recalculated as $y_i=G_i(x_i)=F_i(GainH_i\times x_i)$ in the range of $InH_i\leqq x_i\leqq InMAX_i$ in the case of $GainH_i\leqq 1$, whereby it is possible to further increase color accuracy of the displayed image after the white balance adjustment is made, thereby further increasing accuracy of the white balance adjustment.

In addition, according to the present embodiment, the microcomputer 12 can notify an error if the microcomputer 12 checks and determines that there is an area in the correction data where the post-correction values $y_i=G_i(x_i)$ decline (i.e. the post-correction values $y_i=G_i(x_i)$ decrease as the pre-correction values $x_i$ increase) so that an operator can be aware of the occurrence of a declination error of the post-correction values $y_i=G_i(x_i)$. This makes it possible for the operator to allow the microcomputer 12 to use another method (another equation) to recalculate the correction data in the LUTs 35R, 35G, 35B for the LCD panel 7 in which the declination error of the post-correction values $y_i=G_i(x_i)$ has occurred, so that the declination error of the post-correction values $y_i=G_i(x_i)$ can be prevented, or so that the LCD panel 7, in which the declination error of the post-correction values $y_i=G_i(x_i)$ has occurred, can be separated out as a defective product.

It is to be noted that the present invention is not limited to the above embodiment, and various modifications are possible within the spirit and scope of the present invention. For example, the image processor 6 can be modified by replacing the gain adjustment with offset adjustment. More specifically, instead of using the Low and High side adjustment gain values GainL and GainH, it can be designed to recalculate correction data in the LUTs based on an offset value provided to the Low side adjustment input value InL to bring the color balance of the Low side white balance adjustment image to a predetermined color balance, and based on an offset value provided to the High side adjustment input value InH to bring the color balance of the High side white balance adjustment image to a predetermined color balance.

Figure 4:
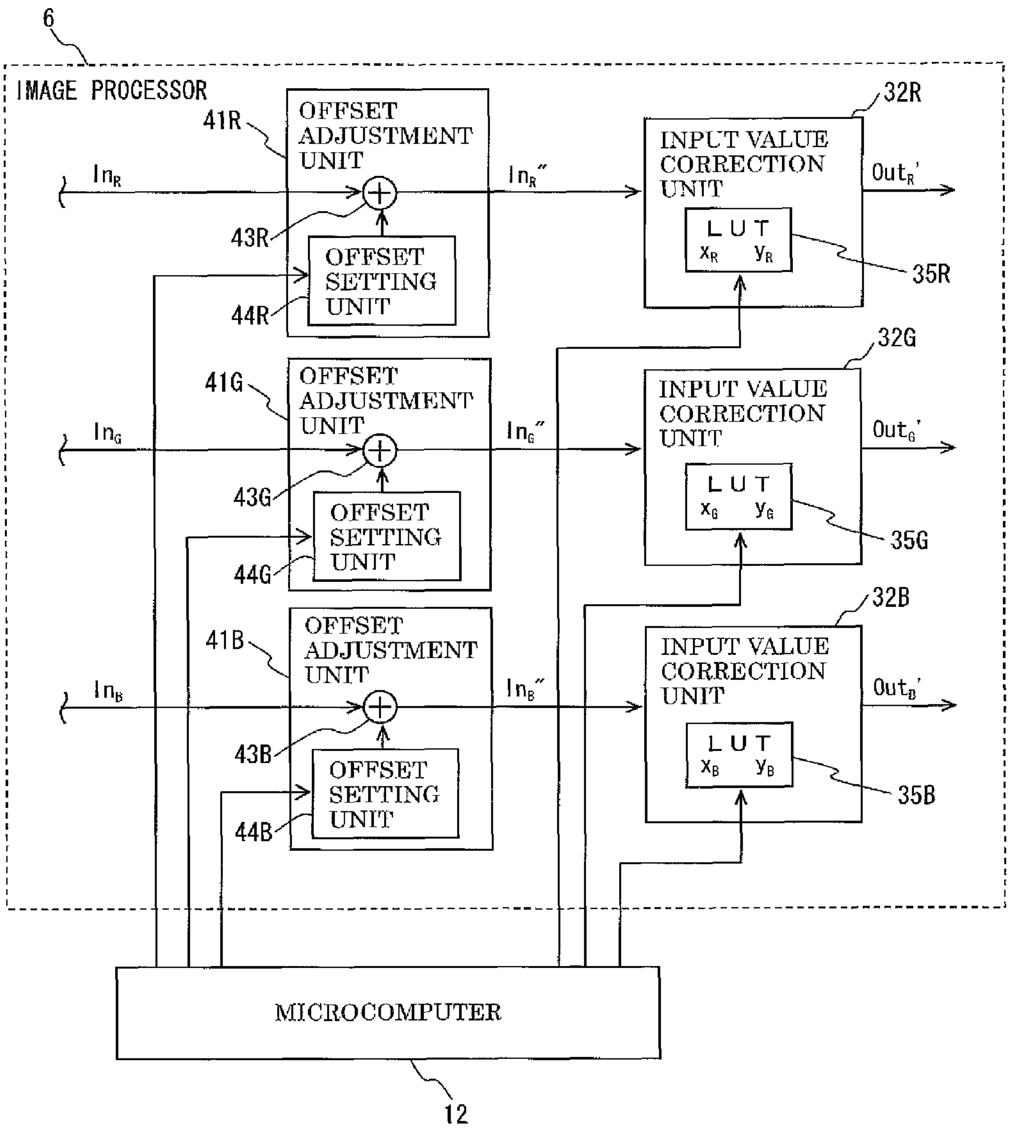
FIG. 4 is a schematic block diagram of a modified example of the image processor with the microcomputer in the LCD television.

FIG. 4 is a schematic block diagram of a modified example of the image processor 6 with the microcomputer 12 in the LCD television 1. As shown in FIG. 4, in place of the gain adjustment units 31R, 31G, 31B in the image processor 6 shown in FIG. 2, the image processor 6 of FIG. 4 comprises offset adjustment units 41R, 41G, 41B as will be described in detail below. More specifically, the image processor 6 comprises the offset adjustment units 41R, 41G, 41B and the input value correction units 32R, 32G, 32B. The offset adjustment units 41R, 41B, 41G serve to provide offset to the input signal values $In_R$, $In_G$, $In_B$ representing brightness levels of respective colors of red, green and blue in the image data. The offset adjustment unit 41R comprises an adder circuit 43R and an offset setting unit 44R, and the offset adjustment unit 41G comprises an adder circuit 43G and an offset setting unit 44G, while the offset adjustment unit 41B comprises an adder circuit 43B and an offset setting unit 44B.

The adder circuit 43R of the offset adjustment unit 41R provides an offset to the input signal value $In_R$ representing the brightness level of red by adding an offset value set in the offset setting unit 44R to the input signal value $In_R$ (input signal value $In_R$ provided with an offset being hereafter referred to as offset-modified input signal value $In_R$"). The adder circuit 43G of the offset adjustment unit 41G provides an offset to the input signal value $In_G$ representing the brightness level of green by adding an offset value set in the offset setting unit 44G to the input signal value $In_G$ (input signal value $In_G$ provided with an offset being hereafter referred to as offset-modified input signal value $In_G$"). Similarly, the adder circuit 43B of the offset adjustment unit 41B provides an offset to the input signal value $In_B$ representing the brightness level of blue by adding an offset value set in the offset setting unit 44B to the input signal value $In_B$ (input signal value $In_B$ provided with an offset being hereafter referred to as offset-modified input signal value $In_B$").

The offset-modified input signal values $In_R$", $In_G$", $In_B$" (i.e. the input signal values $In_R$, $In_G$, $In_B$ provided with the offset by the offset adjustment units 41R, 41G, 41B that are output signal values of the offset adjustment units 41R, 41G, 41B) are respectively input to the input value correction units 32R, 32G, 32B. The input value correction units 32R 32G, 32B correct the offset-modified input signal values $In_R$", $In_G$", $In_B$" based on the correction data in the LUTs 35R, 35G, 35B, respectively. More specifically, the input value correction unit 32R uses the LUT 35R as a reference to output, as an output signal value $OUT_R$', a post-correction value $y_R$ which corresponds to a pre-correction value $x_R$ equal to the offset-modified input signal value $In_R$".

Further, the input value correction unit 32G uses the LUT 35G as a reference to output, as an output signal value $OUT_G$', a post-correction value $y_G$ which corresponds to a pre-correction value $x_G$ equal to the offset-modified input signal value $In_G$". Similarly, the input value correction unit 32B uses the LUT 35B as a reference to output, as an output signal value $OUT_B$', a post-correction value $y_B$ which corresponds to a pre-correction value $x_B$ equal to the offset-modified input signal value $In_B$". The output values $OUT_R$', $OUT_G$', $OUT_B$' output from the input value correction units 32R 32G, 32B (i.e. input signal values after corrected by the input value correction units 32R 32G, 32B) are supplied to the LCD panel 7 so that an image based on the output signal values $OUT_R'$, $OUT_G'$, $OUT_B'$ is displayed on the LCD panel 7.

In a manner corresponding to the recalculation of the correction data for the gain adjustment as described above, the microcomputer 12 recalculates the correction data in the LUTs 35R, 35G, 35B in the image processor 6 according to the modified example as follows. The microcomputer 12 allows the offset adjustment units 41R, 41G, 41B to provide offset to Low side adjustment input value InL and High side adjustment input value InH (which correspond to $In_R$, $In_G$, $In_B$ in FIG. 4), thereby generating offset-modified Low side and High side adjustment input values (which correspond to $In_R''$, $In_G''$, $In_B''$ in FIG. 4), and corrects the offset-modified Low side and High side adjustment input values based on the correction data in the LUTs 35R, 35G, 35B. A Low side white balance adjustment image and a High side white balance adjustment image are then displayed on the LCD panel 7 based on the corrected offset-modified Low side and High side adjustment input values (which correspond to $OUT_R'$, $OUT_G'$, $OUT_B'$ in FIG. 4).

The offset values provided by the offset adjustment units 41R, 41G, 41B to the Low side adjustment input values to bring the color balance of the Low side white balance adjustment image displayed on the LCD panel 7 to a predetermined color balance are determined by the microcomputer 12 as Low side adjustment offset values. Similarly, the offset values provided by the offset adjustment units 41R, 41G, 41B to the High side adjustment input values to bring the color balance of the High side white balance adjustment image displayed on the LCD panel 7 to a predetermined color balance are determined by the microcomputer 12 as High side adjustment offset values. The microcomputer 12 performs recalculations corresponding to those for the gain adjustment described above by using the Low side and High side adjustment offset values in place of the Low side and High side adjustment gain values GainL and Gain H described above, so as to recalculate the correction data in the LUTs 35R, 35G, 35B. The correction data in the LUTs 35R, 35G, 35B are updated to the recalculated correction data.

In addition, the post-correction value y=G(x) can be recalculated using another equation than those described in the above embodiment in the range of either $InL<x<InH$ or $InH \leqq x \leqq InMAX$. For example, y=G(x) can be recalculated as $y=G(x)=F(a0 \times x+b0)$ in the range of $InL<x<InH$ where $a0=(InH'-InL')/(InH-InL)$, $b0=InL'-InL \times (InH'-InL')/(InH-InL)$, $InL'=InL \times GainL$ and $InH'=InH \times GainH$. Further, y=G(x) can be recalculated as $y=G(x)=F(a1 \times x+b1)$ in the range of $InH \leqq x \leqq InMAX$ in the case of $GainH>1$, where $a1=(InMAX'-InH')/(InMAX-InH)$, $b1=InH'-InH \times (InMAX'-InH')/(InMAX-InH)$, $InH'=InH \times GainH$ and $InMAX'=InMAX$.

Furthermore, although the number of adjustment images in the above embodiment is two (Low and High), it can be more than or equal to three so as to allow recalculation of correction data in the LUTs by using the more than or equal to three adjustment images. It is also possible to display results of the LUT correction data recalculation (using an image corresponding to FIG. 3) on the LCD panel when the LUT correction data recalculation is performed. Still further, the color display unit to be used for displaying an image is not limited to an LCD panel, and may be a plasma display panel, a CRT display panel, an organic EL display panel, or the like. Similar functions and effects to those obtained by the LCD panel can be obtained by the plasma display panel, the CRT display panel, the organic EL display panel, or the like, making it possible to increase accuracy of white balance adjustment. Furthermore, the present invention can be applied not only to an LCD television, but to other image display devices including: an image display device to be connected to an AV (Audio Video) device such as a BD (Blue-Ray Disc) player; an image display device to be used for a personal computer; and an image display device of a video camera type to capture images and display the captured images on a color display.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2011-030138 filed Feb. 15, 2011, the content of which is hereby incorporated by reference.

The invention claimed is:

1. An image display device comprising:

a color display unit for displaying a color image;

a look-up table which stores correction data for correcting color balance of the color image to be displayed on the color display unit;

look-up table recalculating means for recalculating the correction data in the look-up table; and look-up table updating means for updating the correction data in the look-up table to the correction data recalculated by the look-up table recalculating means, wherein the correction data in the look-up table represents a relationship between a pre-correction value representing a pre-correction brightness level of each of colors including red, green and blue and a post-correction value representing a brightness level to be output after correcting the pre-correction value, wherein an input signal value representing a brightness level of each of colors including red, green and blue in an input image data is corrected based on the correction data in the look-up table so that the color display unit displays a color image based on the corrected input signal value on the color display unit, and wherein assuming that x denotes the pre-correction value, y=F(x) denotes the post-correction value before recalculation by the look-up table recalculating means, and y=G(x) denotes the post-correction value after recalculation by the look-up table recalculating means, the look-up table recalculating means recalculates the post-correction value in the look-up table as:

$y=G(x)=F((\alpha \times GainH+(1-\alpha) \times GainL) \times x)$ in the range of $InL<x<InH$, and where $\alpha=(x-InL)/(InH-InL)$, and where InL, InH, GainL and GainH denote:

InL: input signal value of image data of a lower brightness white balance adjustment image which is one of at least two white balance adjustment images with a lower brightness level, InH: input signal value of image data of a higher brightness white balance adjustment image which is another one of the at least two white balance adjustment images with a higher brightness level, GainL: gain value provided to the input signal value InL of the image data of the lower brightness white balance adjustment image so as to bring the color balance of the lower brightness white balance adjustment image to a predetermined color balance, and GainH: gain value provided to the input signal value InH of the image data of the higher brightness white balance adjustment image so as to bring the color balance of the higher brightness white balance adjustment image to a predetermined color balance.

2. The image display device according to claim 1, wherein the look-up table recalculating means recalculates the correction data in the look-up table by using, in place of GainL, an offset value provided to the input value InL of the image data of the lower brightness white balance adjustment image so as to bring the color balance of the lower brightness white balance adjustment image to the predetermined color balance, and by using, in place of GainH, an offset value provided to the input value InH of the image data of the higher brightness white balance adjustment image so as to bring the color balance of the higher brightness white balance adjustment image to the predetermined color balance.

3. The image display device according to claim 2, which further comprises error notification means for checking the recalculated correction data to notify an error if the error notification means determines that there is an area in the recalculated correction data where the post-correction value y=G(x) decreases as the pre-correction value x increases.

4. The image display device according to claim 1, which further comprises error notification means for checking the recalculated correction data to notify an error if the error notification means determines that there is an area in the recalculated correction data where the post-correction value y=G(x) decreases as the pre-correction value x increases.

5. An image display device comprising:

a color display unit for displaying a color image;

a look-up table which stores correction data for correcting color balance of the color image to be displayed on the color display unit;

look-up table recalculating means for recalculating the correction data in the look-up table; and look-up table updating means for updating the correction data in the look-up table to the correction data recalculated by the look-up table recalculating means, wherein the correction data in the look-up table represents a relationship between a pre-correction value representing a pre-correction brightness level of each of colors including red, green and blue and a post-correction value representing a brightness level to be output after correcting the pre-correction value, wherein an input signal value representing a brightness level of each of colors including red, green and blue in an input image data is corrected based on the correction data in the look-up table so that the color display unit displays a color image based on the corrected input signal value on the color display unit, and wherein assuming that x denotes the pre-correction value, y=F(x) denotes the post-correction value before recalculation by the look-up table recalculating means, and y=G(x) denotes the post-correction value after recalculation by the look-up table recalculating means, the look-up table recalculating means recalculates the post-correction value in the look-up table as:

$y=G(x)=F((\beta\times 1+(1-\beta)\times GainH)\times x)$ in the range of $InH \leqq x \leqq InMAX$ in the case of GainH>1, where $\beta=(x-InH)/(InMAX-InH)$, and where InH, InMAX and GainH denote:

InH: input signal value of image data of a higher brightness white balance adjustment image which is one of at least two white balance adjustment images with a higher brightness level, InMAX: maximum possible value of the pre-correction value x, and GainH: gain value provided to the input signal value InH of the image data of the higher brightness white balance adjustment image so as to bring the color balance of the higher brightness white balance adjustment image to a predetermined color balance.

6. The image display device according to claim 5, wherein assuming that InL denotes an input signal value of image data of a lower brightness white balance adjustment image which is another one of the at least two white balance adjustment images with a lower brightness level, and that GainL denotes a gain value provided to the input signal value InL of the image data of the lower brightness white balance adjustment image so as to bring the color balance of the lower brightness white balance adjustment image to a predetermined color balance, the look-up table recalculating means recalculates the correction data in the look-up table by using, in place of GainL, an offset value provided to the input value InL of the image data of the lower brightness white balance adjustment image so as to bring the color balance of the lower brightness white balance adjustment image to the predetermined color balance, and by using, in place of GainH, an offset value provided to the input value InH of the image data of the higher brightness white balance adjustment image so as to bring the color balance of the higher brightness white balance adjustment image to the predetermined color balance.

7. The image display device according to claim 6, which further comprises error notification means for checking the recalculated correction data to notify an error if the error notification means determines that there is an area in the recalculated correction data where the post-correction value y=G(x) decreases as the pre-correction value x increases.

8. The image display device according to claim 5, which further comprises error notification means for checking the recalculated correction data to notify an error if the error notification means determines that there is an area in the recalculated correction data where the post-correction value y=G(x) decreases as the pre-correction value x increases.

9. An image display device comprising:

a color display unit for displaying a color image;

a look-up table which stores correction data for correcting color balance of the color image to be displayed on the color display unit;

look-up table recalculating means for recalculating the correction data in the look-up table; and look-up table updating means for updating the correction data in the look-up table to the correction data recalculated by the look-up table recalculating means, wherein the correction data in the look-up table represents a relationship between a pre-correction value representing a pre-correction brightness level of each of colors including red, green and blue and a post-correction value representing a brightness level to be output after correcting the pre-correction value, wherein an input signal value representing a brightness level of each of colors including red, green and blue in an input image data is corrected based on the correction data in the look-up table so that the color display unit displays a color image based on the corrected input signal value on the color display unit, and wherein assuming that x denotes the pre-correction value, y=F(x) denotes the post-correction value before recalculation by the look-up table recalculating means, and $y=G(x)$ denotes the post-correction value after recalculation by the look-up table recalculating means, the look-up table recalculating means recalculates the post-correction value in the look-up table as:

$y=G(x)=F((\alpha \times GainH+(1-\alpha)\times GainL)\times x)$ in the range of $InL<x<InH$, and $y=G(x)=F((\beta \times 1+(1-\beta)\times GainH)\times x)$ in the range of $InH \leqq x \leqq InMAX$ in the case of $GainH>1$, where $\alpha=(x-InL)/(InH-InL)$, where $\beta=(x-InH)/(InMAX-InH)$, and where InL, InH, InMAX, GainL and GainH denote:

InL: input signal value of image data of a lower brightness white balance adjustment image which is one of at least two white balance adjustment images with a lower brightness level, InH: input signal value of image data of a higher brightness white balance adjustment image which is another one of the at least two white balance adjustment images with a higher brightness level, InMAX: maximum possible value of the pre-correction value x, GainL: gain value provided to the input signal value InL of the image data of the lower brightness white balance adjustment image so as to bring the color balance of the lower brightness white balance adjustment image to a predetermined color balance, and GainH: gain value provided to the input signal value InH of the image data of the higher brightness white balance adjustment image so as to bring the color balance of the higher brightness white balance adjustment image to a predetermined color balance.

10. The image display device according to claim 9, wherein the look-up table recalculating means recalculates the post-correction value in the look-up table as:

$y=G(x)=F(GainL \times x)$ in the range of $InMIN \leqq x \leqq InL$; and $y=G(x)=F(GainH \times x)$ in the range of $InH \leqq x \leqq InMAX$ in the case of $GainH \leqq 1$, where InMIN denotes a minimum possible value of the pre-correction value x.

11. The image display device according to claim 10, wherein the look-up table recalculating means recalculates the correction data in the look-up table by using, in place of GainL, an offset value provided to the input value InL of the image data of the lower brightness white balance adjustment image so as to bring the color balance of the lower brightness white balance adjustment image to the predetermined color balance, and by using, in place of GainH, an offset value provided to the input value InH of the image data of the higher brightness white balance adjustment image so as to bring the color balance of the higher brightness white balance adjustment image to the predetermined color balance.

12. The image display device according to claim 11, which further comprises error notification means for checking the recalculated correction data to notify an error if the error notification means determines that there is an area in the recalculated correction data where the post-correction value $y=G(x)$ decreases as the pre-correction value x increases.

13. The image display device according to claim 10, which further comprises error notification means for checking the recalculated correction data to notify an error if the error notification means determines that there is an area in the recalculated correction data where the post-correction value $y=G(x)$ decreases as the pre-correction value x increases.

14. The image display device according to claim 9, wherein the look-up table recalculating means recalculates the correction data in the look-up table by using, in place of GainL, an offset value provided to the input value InL of the image data of the lower brightness white balance adjustment image so as to bring the color balance of the lower brightness white balance adjustment image to the predetermined color balance, and by using, in place of GainH, an offset value provided to the input value InH of the image data of the higher brightness white balance adjustment image so as to bring the color balance of the higher brightness white balance adjustment image to the predetermined color balance.

15. The image display device according to claim 14, which further comprises error notification means for checking the recalculated correction data to notify an error if the error notification means determines that there is an area in the recalculated correction data where the post-correction value $y=G(x)$ decreases as the pre-correction value x increases.

16. The image display device according to claim 9, which further comprises error notification means for checking the recalculated correction data to notify an error if the error notification means determines that there is an area in the recalculated correction data where the post-correction value $y=G(x)$ decreases as the pre-correction value x increases.

* * * * *